United States Patent [19]

Tsang et al.

[11] Patent Number: 5,114,901

[45] Date of Patent: May 19, 1992

[54] CERAMIC COATING FOR A CATALYST SUPPORT

[75] Inventors: Chih-Hao M. Tsang, Davison; Raymond E. Bedford, Burton, both of Mich.

[73] Assignee: General Motors Corporation, Detroit, Mich.

[21] Appl. No.: 656,663

[22] Filed: Feb. 19, 1991

[51] Int. Cl.$^5$ .......................... B01J 21/08; B01J 32/00
[52] U.S. Cl. .................................. 502/240; 502/261; 502/439
[58] Field of Search ................ 502/232, 439, 261, 240

[56] References Cited

U.S. PATENT DOCUMENTS

| | | | |
|---|---|---|---|
| 4,116,883 | 9/1978 | Rhodes | 502/439 |
| 4,231,900 | 11/1980 | Kato et al. | 502/439 |
| 4,348,362 | 9/1982 | Foss | 422/171 |
| 4,547,485 | 10/1985 | Bowes | 502/439 |
| 4,631,269 | 12/1986 | Lachman et al. | 502/439 |
| 4,749,671 | 6/1988 | Saito et al. | 502/64 |
| 4,760,044 | 7/1988 | Joy, III et al. | 502/303 |
| 4,791,091 | 12/1988 | Bricker et al. | 502/303 |

*Primary Examiner*—Carl F. Dees
*Attorney, Agent, or Firm*—George A. Grove

[57] ABSTRACT

In a preferred method, particles of amorphous silica are used to provide a silica coating suitable for carrying dispersed catalyst particles for the treatment of diesel engine exhaust emissions. The silica coating is formed from a mixture consisting essentially of two groups of the fine silica particles of respective average sizes and size ranges which are virtually non-overlapping. The particles of the first of the two groups have a first average size sufficient to permit the particles of the first group (smaller group) to occupy voids between the particles of the second group (larger group) in a packed arrangement, and preferably the second group has a second average size which is at least 20 times greater than the first average size.

Although particles of amorphous silica are preferred for use in forming a coating with improved adherence suitable for the treatment of diesel exhaust, the method of the invention is also useful to improve the adherence of coatings formed of other ceramics, such as alumina, titania, zirconia and zeolite.

10 Claims, No Drawings

CERAMIC COATING FOR A CATALYST SUPPORT

FIELD OF THE INVENTION

This invention relates to a catalyst support for a catalytic converter. More particularly, it relates to ceramic coatings having improved adherence and significantly less reaction with sulfur compounds when applied to diesel engine exhaust gas catalyst supports.

BACKGROUND OF THE INVENTION

Exhaust emissions from a hydrocarbon-fueled engine, such as in an automotive vehicle, are treated in a catalytic converter which includes catalytic material dispersed on a support. In order to treat vehicle exhaust gas emissions, the support typically includes a multi-channel metal or ceramic base, which is coated with a finely divided refractory oxide or ceramic washcoat material, such as alumina. The catalytic material, carried by the support, promotes oxidation of unburned or partially oxidized hydrocarbons and carbon monoxide and promotes the reduction of nitrogen oxides. In the case of diesel engines, it is necessary to treat diesel particulates which are typically on the order of 0.1 micron in diameter and contain a solid, carbonaceous portion and a soluble organic portion.

Diesel particulates can be collected and removed from an exhaust gas stream by various types of filters or traps In order to remove collected particulate, the traps are heated to an elevated temperature, which is greater than the exhaust temperature, by heaters. This approach to treating particulates is technically difficult and costly, and introduces a variety of other undesirable problems.

It is desirable to treat diesel particulates by continuous catalytic combustion of particulate in the exhaust gas stream over a catalyst in a catalytic converter, in a method similar to the treatment of other hydrocarbon emissions. Converters using substrates coated with alumina, such as alumina-coated monoliths, have been evaluated for this purpose. However, such alumina-coated supports promote an undesirable reaction with sulfur which is present in a relatively large amount in diesel fuels as compared to gasoline.

Silicas have been used as catalyst supports but have not been favored for use with vehicles due to the high temperature of operation of the vehicle, the relatively low thermal stability of silica as compared to alumina, and the relatively low adherence of silica to a base substrate.

In order to attempt to improve adherence of a ceramic, such as silica, it is comminuted to micron size in a ball mill. The milling process is time consuming and produces particles having sizes which may not be suitable for achieving good adherence between the ceramic coating end the base support.

There is a need for an improved catalyst support for use in treating diesel exhaust where the support has a ceramic coating which does not promote the occurrence of undesirable reactions with sulfur, which is suitable for service in the range of temperatures of diesel exhaust gases, which is formed by a method which provides a well-adhered coating and minimizes degradation and loss of the ceramic coating and loss of the catalytic material dispersed thereon, and which does not depend upon the ball milling process to produce ceramic particles of optimal size.

BRIEF SUMMARY OF THE INVENTION

In accordance with the invention, a catalyst support is prepared, with a coating of ceramic well adhered to a substrate, by first selecting at least two groups of fine ceramic particles of virtually non-overlapping sizes and size ranges, where the ratios, defined by the average sizes of any two of the groups selected, is sufficient such that, in a packed arrangement, the particles of at least one of the groups occupies voids between the particles of at least one of, and preferably all of, the other groups.

The selected particles are then mixed together in a suspension in order to permit the particles to move with respect to one another. The suspension is applied as a layer onto a support substrate in a packed arrangement to provide the well-adhered coating in a form suitable for carrying dispersed catalytic material.

In a preferred method, the ceramic particles are amorphous silica, which provides a silica coating suitable for carrying dispersed catalyst particles for the treatment of diesel engine exhaust emissions. The silica coating is formed from a mixture consisting essentially of two groups of the fine silica particles of respective average sizes and size ranges which are virtually non-overlapping The particles of the first of the two groups have a first average size sufficient to permit the particles of the first group (smaller group) to occupy voids between the particles of the second group (larger group) in a packed arrangement, and preferably the second group has a second average size which is at least 20 times greater than the first average size.

The suspension used to apply the particles is preferably a wet slurry. The applied slurry is dried and calcined to produce the packed and well-adhered silica coating, suitable for carrying dispersed catalytic material.

In order to achieve a practical thickness of the coating of up to about 200 microns, and to minimize the use of excess slurry, desirably, the second group (larger group) of particles has an average size of less than 100 microns.

Preferably, the adhered coating is impregnated with a catalytic material, which is distributed and dispersed thereon. Alternatively, the catalytic material may be included with the particles in the suspension or slurry.

Silica coatings produced by the method of the invention and characterized by improved adherence are conveniently formed using commercially available amorphous silica precursors of respective average sizes and size ranges which are virtually non-overlapping. Preferably, a first silica precursor has particles with an average size of about 0.02 microns (200 angstroms), a size range of about 0.01 (100 angstroms) to about 0.1 (1000 angstroms) microns and a majority of particles in a range of about 0.02 to about 0.1 microns.

A second silica precursor, preferably a colloid, has an average particle size of about 14 microns, a size range of about 2 to about 30 microns and a majority of particles in a size range of about 5 to about 20 microns.

In accordance with the invention, a powder consisting essentially of the first (smaller) and second (larger) amorphous silica precursors is provided for use in making an adhered coating in a form suitable for treatment of diesel exhaust, wherein the first (smaller) precursor constitutes about 20 to about 80 percent, and preferably 40 percent of the weight of the powder and the second group essentially constitutes the balance.

It should be noted that ceramic particles of the invention, although often referred to as having a diameter, have irregular shapes. For convenience, such irregularly shaped particles are said to have an equivalent diameter which corresponds to an equivalent spherical shape. That is, an equivalent spherical diameter is the diameter of a sphere having a volume equal to the volume occupied by the irregularly shaped object. For purposes of the invention, the term "size" refers to the equivalent spherical diameter.

Although particles of amorphous silica are preferred for use in forming a coating with improved adherence, suitable for the treatment of diesel exhaust, the method of the invention may also be useful to improve the adherence of coatings formed of other ceramics, such as alumina, titania, zirconia and zeolite.

The silica coatings produced by the method of the invention may be applied by conventional means as a washcoat layer on a support substrate which is a monolith support having a base desirably of metal or ceramic. Preferably, the monolith has a metal base, with alumina whiskers, and the coating overlies the whiskers.

Objects, features and advantages of this invention are to provide an improved catalyst support with good adherence between the coating and the base substrate, which is suitable for the treatment of diesel exhaust, which minimizes loss of coating and catalytic material dispersed thereon, which also minimizes the sulfur-washcoat reaction. It is also an object to provide a powder of silica particles of sizes and size ranges suitable for use in making the silica coating by the preferred method of the invention.

These and other objects, features and advantages of the invention will be appreciated in view of the detailed description which follows.

DETAILED DESCRIPTION OF THE PREFERRED EMBODIMENTS

A catalyst support is prepared with a well-adhered coating of ceramic by first selecting at least two groups of fine ceramic particles of virtually non-overlapping sizes and size ranges, where ratios, defined by the average sizes of any two of the groups selected, are sufficient such that, in a packed arrangement, the particles of at least one of the groups occupy voids between the particles of at least one of, and preferably all of, the other groups.

The selected particles are then mixed together in a suspension in order to permit the particles to move with respect to one another. The suspension is applied as a layer onto a support substrate in a packed arrangement to provide the well-adhered coating in a form suitable for carrying dispersed catalytic material.

In a preferred method of forming a well-adhered coating suitable for the treatment of diesel exhaust, the selected particles are of amorphous silica and comprise two groups of fine silica particles of non-overlapping sizes and size range$ where one of the groups has an average size which is at least 20 times greater than the average size of the other group. Desirably, the catalyst support has a base of ceramic or metal and is preferably a monolithic support.

Preferably, a first silica precursor has particles with an average size of about 0.02 microns (200 angstroms), a size range of about 0.01 (100 angstroms) to about 0.1 (1000 angstroms) microns and a majority of particles in a range of about 0.02 to about 0.1 microns.

A second silica precursor, preferably a colloid, has an average particle size of about 14 microns, a size range of about 2 to about 30 microns and a majority of particles in a size range of about 5 to about 20 microns.

EXAMPLE 1

PART 1 - Preparation of Slurry

In this example, two groups of the preferred silica particles were selected.

The first group was colloid silica, with a BET surface area in the range of 100 to 150 $m^2/g$ ($meters^2$/gram), as received, from the vendor, Nalco. The colloid silica particles are known as Nalco 2327. The particles had an average size, that is, an equivalent spherical diameter, of about 0.02 microns. (An equivalent spherical diameter is the diameter of a sphere having a volume equal to the volume occupied by an irregularly shaped object).

The second group was powder silica with a BET surface area in the range of 450–470 $m^2/g$, as received from the vendor, Rhone-Poulenc. The particles are known as Rhone-Poulenc-540 GM. The particles had an average size, that is, an equivalent spherical diameter, of about 14 microns.

The two groups were intermingled in a mixture wherein the Rhone-Poulenc particles, having an average diameter of about 14 microns (second group), constituted approximately 40 percent, by weight, of the particles in the mixture and the Nalco colloid silica (first group) constituted the balance, or about 60 percent of the weight of the particles in the mixture.

The particles were suspended in an aqueous slurry by mixing the particles in water. Initially, about 90 grams of water were used for every 100 grams of the silica particle mixture. The pH of the aqueous slurry was about 7.7. The slurry was stirred at a rate sufficient to convert the slurry from a slightly gelatinous condition to a slightly fluid or thixotropic condition, while adjusting the viscosity to approximately 300 centipoise.

PART 2 - Application of Slurry

Next, the wet slurry was applied as a washcoat layer onto the metal monoliths each with a herringbone type pattern, that is, a ridge and groove pattern, and folded or rolled into a multicell or multichannel converter body. The monoliths designated as type M110 had a volume of 110 cubic inches and 225 cells per square inch and had alumina whiskers on exhaust gas contacting surfaces (channels) onto which the silica washcoat layer was applied. The M110 monoliths were of a steel composition consisting nominally by weight of 5 percent aluminum, 18 percent chromium, a small amount of carbon, small amounts of impurities and the balance iron.

In order to achieve a desired coating thickness on each of the M110-type monoliths, an amount of slurry was used sufficient to provide a coating of 185 grams, after drying and calcining.

The amount of washcoat layer applied as a slurry is not critical, however, excess slurry may plug the cells on the monolith.

Immediately after the silica washcoat was applied, the channels of the monolith were blown out to prevent plugging. Next, each coated monolith was dried in warm air at about 80° C. for about 15 min/hours. In order to prevent plugging of the cells, the monolith could be tumbled during drying. The dried monoliths were then calcined at 427° C. for one hour in a furnace.

PART 3 - Addition of Catalytic Material

Precious metal catalytic material was dispersed onto the coated monoliths by a post impregnation method. Such post impregnation methods are generally known in the art. In this example, monoliths with calcined coatings were immersed in an aqueous solution of a tetra amine palladium compound, $Pd(NH_3)_4Cl_2$ in which Pd belongs to the positively charged complex ion $Pd(NH_3)_4$ having a +2 charge. A suitable concentration of the tetra amine palladium compound was used to achieve a take-up or load of 0.1 troy ounce (T.O.). The time of immersion and the concentration of the palladium compound in the solution are critical; they have to be adjusted in order to obtain a desired loading.

The loaded monoliths were dried and then calcined at about 427° C. for one hour to provide activated monoliths, that is, monoliths with catalytically active palladium.

EXAMPLE 2

In Example 2, the method of Example 1 was followed except that the catalyst was platinum from a tetra amine platinum precursor, $Pt(NH_3)_4$ with a +2 charge.

EXAMPLE 3

The method of Example 1 was followed except that the catalyst material was from a palladium chloride precursor, $PdCl_2$, which after being dissolved in the presence of HCl contained Pd in the negatively charged complex, $PdCl_4$, having a −2 charge.

EXAMPLE 4

The method of Example 1 was followed except that the catalyst material was platinum from a platinum chloride precursor, $PtCl_6$, having a −2 charge.

COMPARATIVE EXAMPLE A-1

Rhone-Poulenc SP540 silica beads (850 grams), 4-7 mm as received, were mixed with distilled water (932 grams) in a 1.5 gallon wet mill with 1 inch aluminum balls and milled for 17 hours. The beads had a BET surface area in the range of 270-280 $m^2/g$. The milled slurry was then mixed while adjusting the viscosity to 300 centipoise. Metal monoliths of the M110-type were washcoated with slurry. The coating was dried and calcined in the same manner as discussed in Example 1, Part 2. The monoliths were then loaded with the palladium catalyst of the tetra amine palladium precursor, dried and calcined as per Example 1, Part 3. Over 95 percent of the particles produced in the 1.5 gallon ball mill had sizes, that is, equivalent spherical diameters, between about 0.3 and 20 microns. The particles had a continuous distribution of sizes within the 0.3 to 20 micron range, and there were no distinct groups of sizes.

COMPARATIVE EXAMPLE A-2

Comparative Example A-1 was followed except that the catalyst was palladium from the palladium chloride precursor, $PdCl_2$. A similar particle size distribution was observed.

COMPARATIVE EXAMPLE B

The method of Comparative Example A-1 was used except that a 7 gallon mill was used and the weight of beads and water were, respectively, 3300 grams and 3618 grams. After milling, over 95 percent of the resultant particles had sizes between about 0.3 and 6 microns. The particles had a continuous distribution of sizes within the 0.3 to 6 micron range, and there were no distinct groups of sizes.

The particle sizes produced in the 1.5 gallon mill of Comparative Examples A-1 and A-2 were more scattered than that of the particles made in the 7 gallon mill of Comparative Example B; the coatings of Comparative Examples A-1 and A-2 appeared to be slightly better adhered than that of Comparative Example B. However, in all cases (A-1, A-2 and B), the coatings were observed to fall away from the coated monolith. That is, the coatings of Comparative Examples A-1, A-2 and B emitted silica powder during slight disturbance by normal handling. This was deemed unacceptable as it very likely resulted in the loss of precious metal from the coating, even though the overall percentage of weight loss of the coating was small.

In contrast, the adherence of the coatings of Examples 1 through 4, prepared in accordance with the invention, was found to be good, and powder was not emitted from the coatings during normal handling. Further, an initial test of adherence was conducted by subjecting a monolith of Example 1 and Comparative Example A-1 to a temperature of 650° C. for 10 minutes, and then blowing the coated surfaces with a typical shop air hose. The coating of Comparative Example A-1 had a slightly greater weight loss (less adherence), even in this rudimentary test.

TESTING AND COMPARISON WITH OTHER COATINGS

Table 1 shows the types of activated coatings formed in Examples 1 through 4 by the method of the invention and formed in Comparative Examples A-1 and A-2 by the method which includes ball milling.

The catalysts of the invention, prepared as per Example 1 above, were tested against catalysts prepared by current processes using alumina, alumina enhanced with ceric oxide, and silica prepared by the milled method of Comparative Examples A-1 and A-2.

TABLE 1

| Silicas | | Precious metal ions |
| --- | --- | --- |
| Rhone-Poulenc 540 GM Powder + Nalco 2327 colloid | Ex 1 | $Pd(NH_3)_4^{2+}$ |
| | Ex 2 | $Pt(NH_3)_4^{2+}$ |
| Rhone-Poulenc 540 GM powder + Nalco 2327 colloid | Ex 3 | $PdCl_4^{2-}$ |
| | Ex 4 | $PtCl_6^{2-}$ |
| Rhone-Poulenc SPH 540 beads | Comp Ex A-1 | $Pd(NH_3)_4^{2+}$ |
| Rhone-Poulenc SPH 540 beads | Comp Ex A-2 | $PdCl_4^{2-}$ |

Before testing, each of the prepared monolithic catalysts were aged on a 6.2 L, V-8 diesel engine-dynamometer for 300 hours according to a preset simulated driving schedule, which is an AMA Schedule. The catalyst converter test facility consisted of the dynamometer controlled engine, a gas flow control system, emission analysis and a computer interface. In the simulation, catalysts were aged while exposed to exhaust while engine operation was varied according to the schedule under controlled conditions.

After aging, the catalysts were tested using a 6.2 L, V-8 diesel engine-dynamometer. In the test, the engine was run at 2000 rpm at all times, and the inlet temperature of the exhaust to each converter was controlled during testing by fine-tuning the throttle opening and the backpressure valve downstream of the converter. Efficiency of particulate conversion was measured at three temperatures, starting from 400° C., then 300° C., and finally 200° C. Samples were drawn from the inlet and the outlet of the converter. The particulates were collected on filters. The weights of the filters prior to and after the particulate collection were measured to calculate the weight of particulate collected. The efficiency of particulate conversion was calculated to be the difference in particulate weight collected at the inlet and outlet divided by the inlet.

Table 2 shows the particulate efficiency, at different temperatures, of the silica-coated catalysts prepared by the method of Example 1 as compared to coated alumina-based catalysts and catalysts coated with milled silica, as per Comparative Examples A-1 and A-2.

TABLE 2

| | Washcoat Coating | Pd Precursor | Number of Monoliths Tested | Average Particulate Conversion Efficiency (%) | | |
|---|---|---|---|---|---|---|
| | | | | 400° C. | 300° C. | 200° C. |
| Example 1 | Rhone-Poulenc 540 GM SiO$_2$ powder + Nalco 2327 colloidal SiO$_2$ | Pd(NH$_3$)$_4^{2+}$ | 4 | −56.0 | 29.6 | 56.0 |
| Comp. Ex. A-1 | Rhone-Poulenc SPH 540 SiO$_2$ beads | Pd(NH$_3$)$_4^{2+}$ | 2 | −32.3 | 12.8 | 42.5 |
| Comp. Ex. A-2 | Rhone-Poulenc SPH 540 SiO$_2$ beads Milled | PdCl$_4^{2-}$ | 2 | −40.9 | 41.8 | 64.2 |
| Alumina | Al$_2$O$_3$ | unknown | 2 | −120.4 | −4.4 | 47.0 |
| Alumina/ Ceria | Al$_2$O$_3$ + 21 w % CeO$_2$ | unknown | 4 | −72.2 | 10.9 | 33.9 |

Particulate Efficiency of diesel catalysts after 300 h simulated AMA aging (0.05 T.O. Pd per metal monolith, M110, 225 cells/in$^2$, herringbone)

The negative efficiencies observed at 400° C. were likely due to the conversion of SO$_2$ to H$_2$SO$_4$, which is also counted as a particulate emission.

The alumina-coated sample had the worst particulate efficiency, that is, relatively high particulate emissions. The performance improved when the alumina was mixed with 21 weight percent cerium oxide. All three types of silica-based catalysts (Examples 1 and Comparative Examples A-1 and A-2) showed lower particulate emissions than the alumina and alumina/ceric comparative examples.

In comparing the performance of Comparative Examples A-1 and A-2, it was observed that the coated milled silica beads impregnated with PdCl$_2$ (A-2) gave a higher particulate efficiency than that impregnated using a palladium amine precursor (A-1), especially at 200° C. and 300° C.

The process of the invention (Example 1) using a mixture of Rhone-Poulenc 540 GM powder and Nalco 2327 colloidal silicas provided better particulate conversion compared to Comparative Example A-1, also impregnated with palladium from Pd(NH$_3$)$_4^{2+}$. That is, with the same Pd(NH$_3$)$_4$Cl$_2$ as the precursor, the particulate efficiency of the monolith coated by the method of the invention (Example 1) is higher than that of a monolith washcoated with milled beads (Comparative Example A-1) at 200° C. and 300° C.

The more negative efficiency at 400° C. of the monolith prepared as per Example 1 could be associated with higher oxidation activity a higher conversion of SO$_2$ to SO$_3$.

Considering the results, silica washcoats activated with precious metal chlorides in accordance with the invention, Examples 3 and 4, are the most promising combination.

To further test the improvement in adherence by the method of the invention, additional coatings were formed using the preferred silica precursors, Nalco 2327 (first group) and Rhone-Poulenc 540 GM powder (second group), described in Example 1, Part 1, except that the weight percent of the first and second groups in the mixture varied.

EXAMPLE 5

A slurry was prepared by the method of Example 1, Part 1 from a mixture, as in Example 1, Part 1. That is, the mixture consisted essentially of 60 percent by weight Nalco 2327 (first group) and 40 percent by weight Rhone-Poulenc 540 GM powder (second group). The mixture was suspended in an aqueous slurry.

The aqueous slurry of the mixture was applied to metal foils (1"×3"), cut from M110-type monoliths. The foils were dipped in the slurry, then dried at 80° C. for about ½ hour and then calcined at 427° C. for about 1 hour.

EXAMPLE 6

The method of Example 5 was used except that the first group constituted about 40 percent of the weight of the particle mixture and the second group constituted about 60 percent by weight of the mixture.

COMPARATIVE EXAMPLE C-1

A slurry was prepared in a manner similar to the method of Example 5 except that only the Nalco 2327 (first smaller group) of particles was used.

COMPARATIVE EXAMPLE C-2

The method of Example C-1 was used, except that only the Rhone-Poulenc 540 GM powder (second larger group) of particles was used.

The adherence of the coatings of Examples 5 and 6 and Comparative Examples C-1 and C-2 were checked by dropping an 8"×1" plastic ruler, of about 12.7 grams, vertically from a height of about 12.5", twice onto the coated foil lying underneath. The relative impact positions of the ruler and foil were kept the same for each test.

TABLE 3

| | W % of 0.02 micron colloidal silica (first group) | W % of 14 micron powder silica (second group) | W % loss in adherence test* |
|---|---|---|---|
| Comp. Ex. C-1 | 100 | 0 | 78.5 |
| Example 5 | 60 | 40 | 12.1 |
| Example 6 | 40 | 60 | 0.7 |
| Comp. Ex. C-2 | 0 | 100 | 58.3 |

*average of four runs

The results (Table 3) show that the mixture having two groups of particles, with non-overlapping size ranges, adhered much better. More specifically, the weight loss after impact for the coating of Comparative Examples C-1 and C-2 was over 50 percent. In contrast, the weight loss which resulted from impact on the coating of Example 5 was about 12 percent, and for Example 6, less than 1 percent.

While not wishing to be limited to a particular theory, we believe the method of the invention provides better adherence of a coating to a substrate because the smaller group of particles become closely packed between the larger particles, thereby preventing shrinkage and cracking of the coating. It is thought that improved adherence may also be achieved with coatings prepared from other ceramics, such as alumina, titania, zirconia and zeolite.

The best results were achieved using a substrate having a metal base prepared with alumina whiskers. There may be two reasons why such substrates show good performance. One may be that there is an oxygen sharing between the silica and the alumina. Another may be that the whiskers, spike-like projections on the surface of the metal monolith, provide a framework for building the closely packed silica coating.

Although adherence may be somewhat lessened, the coating may be applied to a metal substrate without alumina whiskers The metal substrate should have some surface oxidation and be relatively rough.

Best results were observed using palladium chloride catalytic material with the silica coating. This appears to be because there are no stray coulomb effects as with other salts, such as the tetra amine. Thus, the take-up or loading of the precious metals is better controlled when chlorides of precious metals are used as precursors with silica coatings.

As described above, the particles of the first group have a first average size, pf, of about 0.02 microns, and the size of the particles of the first group are in a range of about 0.01 to about 0.1 microns, that is, about 0.5 to about 5 times the first average size. The particles of the second group have a second average size, ps, of about 14 microns, and the size of the particles of the second group are in a range of about 2 to about 30 microns, that is, about 0.1 to about 3 times the second average size A ratio defined by ps:pf is at least 20:1. The size ranges are virtually non-overlapping, and the first group has a weight which is about 20 to about 80 percent of the weight of the mixture.

While the practice of the invention has been described in conjunction with a monolith, it is to be understood that the coating may be used on various substrate surfaces. It should also be understood that although the coating is useful in conjunction with noble metal mixtures, such as platinum, palladium and the like, other suitable catalysts may also be used. The catalysts may be included in the slurry prior to applying the slurry onto the substrate or applied by a post-impregnation process, as described.

While the invention has been described in terms of a few specific examples, it will be appreciated that others could readily be adopted by one skilled in the art. Accordingly, the scope of the invention is to be considered limited only by the following claims.

The embodiments of the invention in which an exclusive property or privilege is claimed are defined as follows:

1. A method of making a catalyst support for treatment of exhaust emissions from diesel engines, the improvement comprising:
   a) forming a mixture consisting essentially of two groups of fine silica particles of respective average sizes and size ranges which are virtually non-overlapping, the average size of one of the groups being at least 20 times greater than the average size of the other group;
   b) forming a suspension of the mixture; and
   c) applying the suspension as a layer onto a support substrate in a packed arrangement such that the particles of the one group occupy voids between the particles of the other group to provide an adhered coating in a form suitable for carrying dispersed catalytic material.

2. A method according to claim 1 wherein the step of forming a suspension includes forming a wet slurry of the mixture and wherein the step of applying the suspension includes applying the wet slurry as the layer onto the support substrate and drying and calcining the applied layer to provide the adhered coating.

3. A method according to claim 1 wherein the mixture includes the catalytic material.

4. A method according to claim 1 wherein the adhered coating is impregnated with the catalytic material.

5. A method of making a catalyst support for treatment of exhaust emissions from diesel engines, the improvement comprising:
   a) forming a mixture consisting essentially of first and second groups of fine silica particles each having a size, the particles of the first group having a first average size, pf, the size of the particles of the first group being in a range of about 0.5 to about 5 times the first average size, the particles of the second group having a second average size, ps, the size of the particles of the second group being in a range of about 0.1 to about 3 times the second average size, a ratio defined by ps:pf which is at least 20:1, the ranges being virtually non-overlapping, and the first group having a weight which is about 20 to 80 percent of the weight of the mixture;
   b) forming a suspension of the mixture; and
   c) applying the suspension as a layer onto a support substrate in a packed arrangement such that the particles of the first group occupy voids between the particles of the second group to provide an adhered coating in a form suitable for carrying dispersed catalytic material.

6. A method according to claim 5 wherein the step of forming a suspension includes forming a wet slurry of the mixture and wherein the step of applying the suspension includes applying the wet slurry as the layer onto the support substrate and drying and calcining the applied layer to provide the adhered coating.

7. A method according to claim 5 wherein the second average size is about 14 microns, and the ratio is about 700:1.

8. A method according to claim 5 wherein the mixture of particles includes the catalytic material.

9. A method according to claim 5 wherein the adhered coating is impregnated with the catalytic material.

10. A method according to claim 5 wherein the substrate onto which the mixture is applied comprises a monolithic-type catalyst support body of one selected from the group of ceramic, metal and metal with ceramic whiskers thereon.

* * * * *